Mar. 27, 1923.

J. WELTMER.
RESILIENT TIRE AND WHEEL.
FILED JAN. 24, 1922.

Inventor
Joseph Weltmer
By John F. Dubbs
Attorney

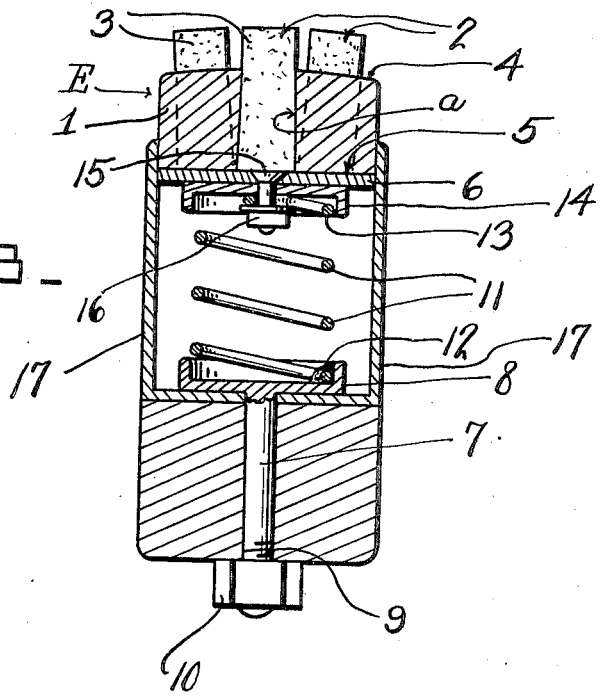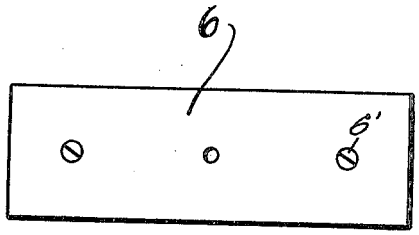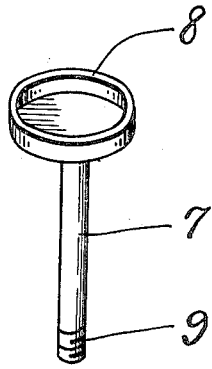

Patented Mar. 27, 1923.

1,449,471

UNITED STATES PATENT OFFICE.

JOSEPH WELTMER, OF GROVER HILL, OHIO.

RESILIENT TIRE AND WHEEL.

Application filed January 24, 1922. Serial No. 531,441.

*To all whom it may concern:*

Be it known that I, JOSEPH WELTMER, a citizen of the United States, residing at Grover Hill, in the county of Paulding and State of Ohio, have invented certain new and useful Improvements in Resilient Tires and Wheels, of which the following is a specification.

This invention relates to new and useful improvements in resilient tires and wheels.

The primary object of my invention is to provide a construction which is not liable to punctures and blow-outs with its attendant annoyance, inconvenience and cost. A further object of my invention is to provide a tire designed to take the place of the ordinary pneumatic tire now commonly in use and which will afford the same resiliency and comfort in riding. A still further object of my invention is to provide a tire and wheel which is simple and economical in construction, and highly efficient in operation.

With the foregoing and other objects in view that will readily appear as the nature of the invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 3 is a vertical transverse section, taken on line 3—3 of Figure 1, with the parts represented on an enlarged scale.

Figure 4 is a plan view of one of the metal bearing plates used in association with the tire sections, and Figure 5 is a detail perspective view of one of the rim fastening bolts.

Figure 1:
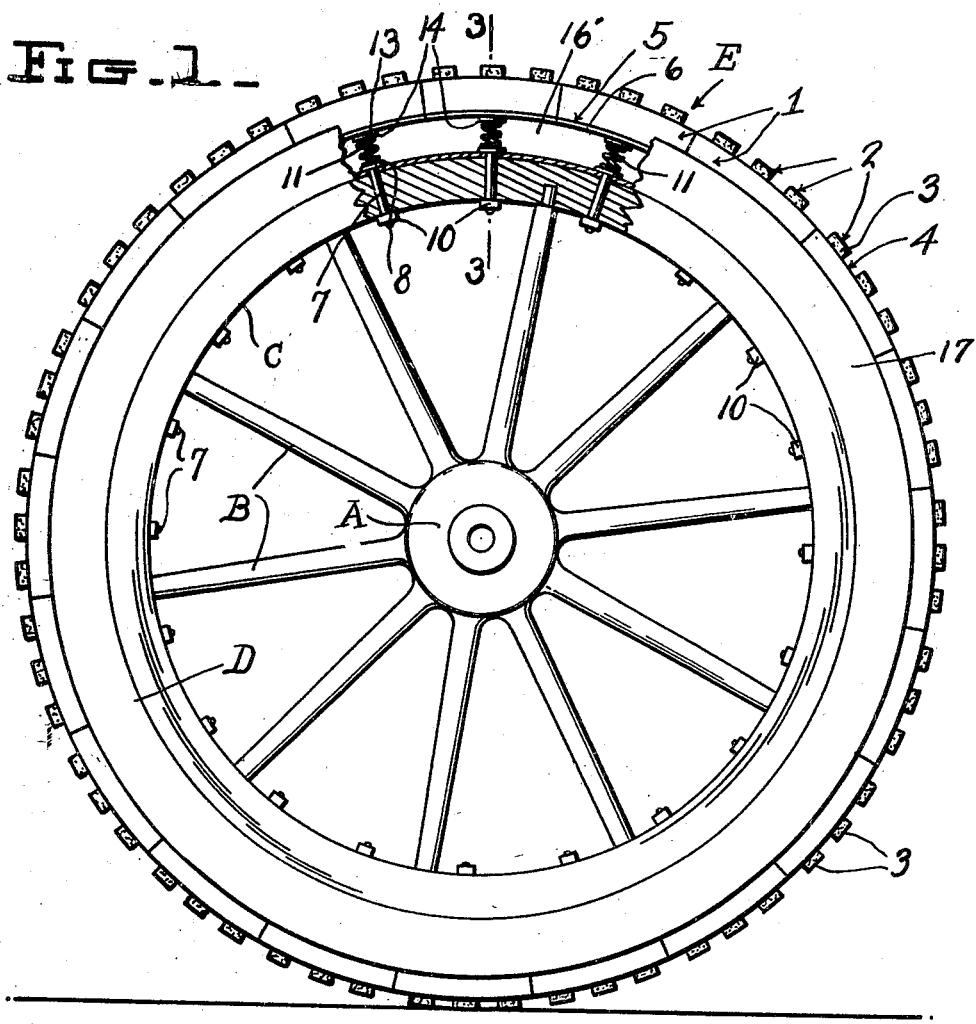
Figure 1 is a side elevation, partly in section, illustrating the application of my invention.
Figure 2:
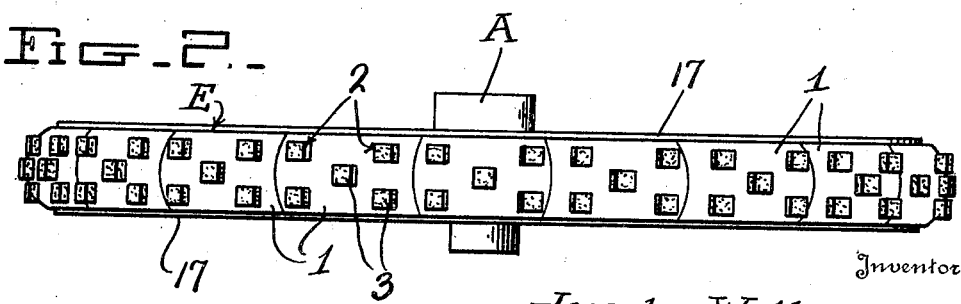
Figure 2 is a plan view.

Referring to the drawings for a more particular description of my invention, and in which drawings like parts are designated by like reference characters throughout the several views, A designates the hub, B the spokes, C the wooden felloe, D the steel rim and E my improved tire. As shown, the tire is formed of a series of contiguous sections 1, of wood, composition, or other suitable material, which extend circumferentially entirely around the wheel and are provided, each, with a plurality of rectangular tread blocks 2, preferably of rubber, which are arranged in corresponding openings a in the tire sections, with their outer ends 3 projecting somewhat beyond the outer faces, as 4, of the latter, as shown more particularly in Figures 1 and 3, and their inner ends, as 5, resting on metal bearing plates 6 on which the tire sections are mounted. Fastening bolts 7 extend through the felloe and rim and are provided at their outer ends with cup-shaped bearing heads 8 and at their inner threaded ends 9 with fastening nuts 10 which screw thereon against the inner periphery of the felloe C. Coil springs 11 are arranged with their inner ends 12 seating in the cup-shaped bearing heads 8 of the bolts 7 and their outer ends 13 seating in bearing cups 14 disposed against the inner faces of the bearing plates 6. As shown more particularly in Figure 3, the outer ends of the coil springs 11 are fastened to the bearing cups 14 and the latter in turn to the bearing plates 6 by fastening screws 15 and nuts 16 screwing on the latter against the outer ends of the springs. The tread sections 1 are secured to the plates 6 by means of screws 6' best shown in Figure 4 of the drawing.

In assembling the parts the following mode may be perceived.

The blocks 2 are inserted in the openings of the section 1 and the plate 6 with the bearing 14 attached thereto is secured to the section 1 by means of the screws 6'. The inner end of the spring 11 is secured to the bearing head 8 by means of a drop of solder or any other securing means and the outer end of the spring 11 is secured to the screw 15. The bolt 7 is then passed through the felly and the nut 10 is applied to the said bolt. To remove or detach the part the operation as above described is reversed.

The tire E is of somewhat greater circumference than the felloe and rim, leaving an annular space 16' therebetween to accommodate the coil springs. The rim D is provided at opposite edges with a pair of laterally spaced guide flanges 17 which work against the outer edges of the tire sections 1 and prevent lateral displacement of the latter when the wheel is in use.

In practice, the outer projecting ends 3 of the rubber tread blocks 2 bear on the road or other surface over which the vehicle is traveling and together with the coil springs 11, provide the required resiliency or elasticity to absorb vibrations or shocks due to any irregularities in the road or other surface.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention as defined in the appended claim.

Having described my invention, what I claim as new and desire to secure by Letters Patent, is:—

In combination with a wheel rim which is approximately U-shaped in transverse section, a cushioning device comprising a section having openings, blocks passing through the openings and projecting beyond the outer surface of the section, a plate secured to the section, a cup member secured to the plate, a spring connected at one end with the cup member at the center thereof, a bearing member connected with the other end of the spring and having a bolt which passes through the intermediate portion of the rim whereby the spring is housed within the rim and the section is received within the side portions of the rim.

In testimony whereof I affix my signature.

JOSEPH WELTMER.